United States Patent [19]
Nakamura et al.

[11] Patent Number: 5,435,348
[45] Date of Patent: Jul. 25, 1995

[54] VALVE ASSEMBLY

[75] Inventors: Kazuyoshi Nakamura, Yokkaichi; Mitsuyo Nakamura, Iwata, both of Japan

[73] Assignee: NTN Corporation, Osaka, Japan

[21] Appl. No.: 256,122

[22] PCT Filed: Sep. 29, 1993

[86] PCT No.: PCT/JP93/01399
§ 371 Date: Aug. 17, 1994
§ 102(e) Date: Jun. 28, 1994

[87] PCT Pub. No.: WO94/10485
PCT Pub. Date: May 11, 1994

[30] Foreign Application Priority Data

Oct. 30, 1992 [JP] Japan .................. 4-293069
Sep. 27, 1993 [JP] Japan .................. 5-239591

[51] Int. Cl.[6] .................. F16K 11/06; F16K 51/00
[52] U.S. Cl. .................. 137/625.17; 137/625.4; 251/368
[58] Field of Search .................. 137/625.17, 625.4; 251/368

[56] References Cited

U.S. PATENT DOCUMENTS 5,256,326 10/1993 Kawato et al. .................. 252/62.54

FOREIGN PATENT DOCUMENTS 63-3058 1/1988 Japan .
2190677 7/1990 Japan .
4-277319 10/1992 Japan .

Primary Examiner—John Rivell
Attorney, Agent, or Firm—Nikaido, Marmelstein, Murray & Oram

[57] ABSTRACT (Object) The object is to provide a valve assembly which has a valve body or bodies whose sliding contact surface has a surface roughness not increasing during use, which is less likely to get damaged by the invasion of foreign matter, and which has an excellent mechanical strength such as creep resistance, so that the water cut-off property and operability are improved.

(Structure)

The valve assembly has a valve seat formed with inlet passages, a valve body kept in sliding contact with the valve seat and formed with flow passages. At least one of the valve seat and the valve body is formed of a resin composition comprising 35-90% by weight of a polycyanoarylether resin, and 10-65% by weight of carbon fiber having an average fiber diameter of not more than 8 μm. Part of the carbon fiber may be replaced by a heat-resistant inorganic powdery filler having an average particle diameter of not more than 20 μm. The heat-resistant inorganic powdery filler and the carbon fiber account for 10-65% by weight.

3 Claims, 2 Drawing Sheets

VALVE ASSEMBLY

TECHNICAL FIELD

This invention relates to a valve assembly for use in a tap water faucet, a faucet for a mixture of hot and cold water or a flow path changeover cock for a cleaner for flushing a toilet bowl with warm water. Such a valve assembly is used to stop the water flow and adjust the flow rate by displacing a valve body with respect to a valve seat.

BACKGROUND ART

With reference to FIGS. 1–4, we shall explain a valve assembly for mixing warm and cold tap water. It has a valve housing 1 having a discharge passage 2 and a recess 5. In the recess 5 are mounted, from below, a valve seat 6, a valve body 7 and a seal ring 8 one upon another. A lever holder 9 is rotatably fitted in the top part of the valve housing 1. It carries a lever 10 for actuating the valve body 7.

The valve seat 6 is fixedly mounted on a base 12 by engagement with protrusions 11 on the base 12 and is formed with a pair of elongated inlet passages 13, 14 in an opposed arrangement (FIG. 2). The passages 13, 14 can be brought into communication with circular inlet passages 3, 4 formed through the base 12.

The valve body 7 is disk-shaped and has a diameter smaller than the inner diameter of the valve housing recess 5. It is slidable relative to the valve seat 6 and the seal ring 8. Between the valve body 7 and the valve seat 6 are provided flow passages 15 formed by two cutouts so as to communicate with the discharge passage 2.

Between the valve seat 6 and the base 12 is mounted a rubber packing. 16. Also, a rubber O-ring 19 is fitted on the top surface of the seal ring 8. By the elasticity of the packing 16 and the O-ring 19, a liquid-tight seal is provided between the base 12 and the valve seat 6, between the valve seat 6 and the valve body 7 and between the valve body 7 and the seal ring 8.

The valve body 7 and the lever 10 are operatively coupled together through a link rod 17 supported on the lever holder 9 by means of a pin 18. By moving up and down and turning the lever 10, the valve body 7 can be moved to a desired position to open the faucet to obtain selectively hot water, cold water or a mixture thereof and to close the faucet.

In the state shown in FIGS. 1 and 2, the valve body 7 is moved to the rightmost end, so that flow passages 15 communicates with neither of the inlet passages 13, 14. In the state of FIG. 3, the valve body 7 is in such a position that the flow passages 15 communicate with one of the inlet passages 13, i.e. the position in which only hot water or cold water is discharged. FIG. 4 shows a position of the valve body 7 in which the flow passages 15 communicate with both of the inlet passages 13, 14, so that a mixture of hot water and cold water is discharged.

In Unexamined Japanese Patent Publication 63-36765, it is disclosed to form one of the valve body 7 and the valve seat 6 of a ceramic material and the other from a resin having self-lubricity such as a fluororesin or a high-molecular weight polyethylene, or a resin containing a filler such as molybdenum disulfide or carbon to improve its lubricity.

But the conventional valve body made of a self-lubricating resin is low in creep resistance. Even if a fibrous filler is added to the material of such a valve body, it cannot sufficiently reinforce the valve body because the wettability between the filler and the resin is low. Such a valve body can withstand only a low water pressure. If it is desired to improve the lubricity of a valve body made of a non-self-lubricating resin that exhibits high reinforcing effect, a large amount of self-lubricating filler has to be added thereto. Addition of such a large amount of filler will lead to marked reduction in shock strength and creep resistance. Such a valve body tends to develop cracks or can have poor water tightness.

Unexamined Japanese Patent Publication 2-190677 discloses a resin composition that shows somewhat improved creep resistance and lubricity. It comprises 25–80% by weight of a polyphenylene sulfide resin and 20–75% by weight of carbon fiber having an average fiber diameter of 8 $\mu$m with inorganic powdery fillers such as natural mica added.

But valve bodies made mainly of polyphenylene sulfide have a problem in that even a very slight inaccuracy in flatness of the sliding contact surfaces between such valve bodies can make difficult liquid-tight contact between the valve bodies. Thus, any increase in the surface roughness due to wear or any inaccuracy in flatness due to swelling, creeping or mechanical or thermal shock can lead to water leakage.

Another major cause of water leakage in the valve device having a valve body or a valve seat made of such a synthetic resin is damage on the sliding contact surfaces of the valve seat and the valve body by foreign matter that has intruded into between the contact surfaces during use, thus decreasing the water cut-off property.

It is therefore an object of this invention to provide a valve assembly which is free of the above problems, which has a valve body that has a sliding contact surface whose surface roughness never increases while in use, which is less likely to be damaged by foreign objects and which has excellent mechanical properties such as creep resistance, thereby showing high water cut-off ability and lever controllability even after long use.

DISCLOSURE OF THE INVENTION

In order to attain this object, according to this invention, there is provided a valve assembly comprising a valve seat formed with inlet passages, a valve body kept in sliding contact with the Valve seat and formed with flow passages, the inlet passages and the flow passages being brought into and out of communication with each other by sliding the valve body with respect to the valve seat, characterized in that at least one of the valve seat and the valve body is formed of a resin composition comprising 35–90% by weight of a polycyanoarylether resin, and 10–65% by weight of carbon fiber having an average fiber diameter of not more than 8 $\mu$m.

Part of the 10–65% by weight carbon fiber may be replaced by a heat-resistant inorganic powdery filler having an average particle diameter not more than 20 $\mu$m. Also, such heat-resistant inorganic powdery filler may be partially or entirely a ceramic powder having an average particle diameter not more than 10 $\mu$m.

More detailed description follows:

The polycyanoarylether resin used in this invention (hereinafter abbreviated to PEN) is a compound comprising repeating units expressed by Formula 1, or a polymer in which about 20 mole % or less of repeating units represented by Formula 2 coexist with the repeating units expressed by Formula 1 at such a ratio that the inherent properties of PEN are maintained.

Such PEN preferably has a reducing viscosity ($\eta sp/C$) of 0.3 dl/g or higher in 0.2 g/dl p-chlorophenol solution kept at 60° C. Some PENs are sold by Idemitsu Kosan as polyethernitrile (ID300). Also, Unexamined Japanese Patent Publication 63-3059 discloses a method of manufacturing PEN.

The carbon fiber used in this invention may be any kind of fiber such as acrylonitrile fiber, pitch fiber or cellulose fiber, provided its average fiber diameter is not more than 8 $\mu$m. Acrylonitrile carbon fiber is especially preferable because it can reinforce mechanical properties such as creep resistance.

An ordinary carbon fiber has an elastic modulus of around 24000 kgf/mm$^2$. But the carbon fiber used in this invention preferably has an elastic modulus of 35000 kgf/mm$^2$ or higher. This is because if the carbon fiber used has a low elastic modulus, many of its fibers tend to be bent under the sliding resistance. Such bent fibers existing between the sliding surfaces may lower the lubricity of the entire composition or promote wear of the valve body. In contrast, if the carbon fiber material has an elastic modulus of 35000 kgf/mm$^2$ or higher, the fiber edges are presumably rubbed off into powder with a light force by the mating material. Such a carbon fiber will thus have little influence on the frictional wear. For the above reason, the carbon fiber used preferably has as small a tensile elongation rate as possible, i.e. 1.0% or less.

The fiber length of carbon fiber is not limited but should preferably be within the range between about 1 and 6 mm. If less than 1 mm, fiber lengths would decrease still further due to stresses exerted during kneading so that it loses its function as a reinforcing material. On the other hand, if longer than 6 mm, it would become difficult to uniformly disperse during kneading. The diameter of the carbon fibers should be not more than 8 $\mu$m. Preferably, their average diameter is 8 $\mu$m or less. The reason is as follows: Some of the carbon fibers near the sliding contact surfaces tend to come off the material or bent by the mating material. Such fibers should be as small in size as possible, e.g. in the form of powder, for better lubricity and higher wear resistance and also for obtaining fine surface roughness during the post-machining of the sliding surface after forming (which we will discuss later).

Further, part of the carbon fiber is preferably replaced by a heat-resistant inorganic powdery filler having an average particle diameter of 20 $\mu$m or less. The heat-resistant inorganic powdery filler herein referred to is an inorganic material that can withstand the forming temperature of PEN, the main component of the composition, i.e. 330°–400° C. and may be mica, talc, kaolin, calcium carbonate, carbon, graphite, silica, clay, magnesium carbonate, antimony trioxide, glass beads or glass balloons.

In order to attain a surface roughness (Ra) of 1.0 $\mu$m or less during the post-forming machining of sliding surface, such a heat-resistant inorganic material should preferably have an average particle diameter of 20 $\mu$m or less. Preferably, 80% by weight of the component has a particle diameter of within the range between 1 and 50 $\mu$m. Most preferably, 80% by weight of the component has a particle diameter of within the range between 1–30 $\mu$m, with the average particle diameter being not more than 10 $\mu$m.

By adding such an inorganic powdery substance to the resin composition, it is possible to reduce the thermal expansion coefficient and the anisotropy in mechanical strength, in comparison with when forming a composition using only carbon fiber, while maintaining good creep resistance and high elasticity. When such a composition is used as a material for a valve assembly for supplying warm water, cold water and a mixture thereof, it becomes possible to cut off water supply with utmost reliability. Among the above-mentioned inorganic powdery materials, mica, calcium carbonate and talc are especially preferable because they can improve lubricity, thus lowering the handle torque. Kaolin and graphite (graphitized particulate phenol) are preferable in that they can improve the wear resistance and thus the durability.

The ceramic powder used in this invention is not limited as to its chemical composition. It may be an oxide ceramic or a non-oxide ceramic. Namely, such a ceramic powder may be a nitride compound including boron nitride and silicon nitride, a boron compound or a silicon compound.

Such a ceramic powder should have an average particle diameter of 10 $\mu$m or less, preferably between 1 and 10 $\mu$m. If less than 1 $\mu$m, its viscosity tends to increase during injection-molding to such a level as to make injection-molding difficult. If larger than 10 $\mu$m, it would be difficult to form a sufficiently flat surface by grinding. This leads to reduced water cut-off capability and increased operating force. Also, the ceramic powder has preferably a hardness of 5000N/mm$^2$ or higher in Vickers hardness. If less than 5000N/mm$^2$, the sliding surface on the valve body or the valve seat will get damaged if relatively hard foreign objects such as metal pieces should get in.

The resin composition forming the valve body of the valve assembly according to this invention comprises 35–90% by weight of PEN and 10–65% by weight of carbon fiber. Part of the 10–65% by weight of carbon fiber may be replaced by a heat-resistant inorganic powdery filler so that the total amount of the heat-resistant inorganic powdery filler and the carbon fiber will be 10–65% by weight. If the content of PEN is over the above-defined range, the elastic modulus of the valve body will be too low to cut off water reliably. If under this range, formability and shock resistance would decrease.

The resin composition forming the valve body of the valve assembly of this invention may further contain substances used as additives for ordinary molding resin compositions. Such substances include lubricity improvers such as molybdenum disulfide, fluororesin, silicone oil and fluorinated oil, reinforcing materials such as glass fiber, boron fiber, wollastonite and potassium titanic acid whiskers, thickening agents such metallic oxides and pigments. These materials have to withstand the forming temperature of PEN and have to be added in such an amount as not to impair the object of the invention.

The valve body of the valve assembly of the present invention is formed by mixing the PEN and the carbon fiber and optionally the inorganic powdery filler and molding such a mixture. They may be mixed using any known technique. For example, these materials and optional additives may be dry-mixed individually or two or more material at a time using a Henschel mixer, a ball mill, a tumbler mill, etc. The mixture thus obtained is melt-mixed with heated rolls, a Banbury mixer, a melt-extruder, etc. to mold it into a predetermined shape.

The melt-mixing temperature should be higher than the melting point of the PEN resin, i.e. between 330 and 400° C., preferably 340°-380° C. The composition may be melt-molded in any desired way. For high mass-productivity and low cost, injection molding is preferable. But only with injection molding, it is very difficult to mold the resin composition to a desired final shape having a sufficiently flat sliding contact surface. Thus, it is preferable to employ the so-called injection-compression molding technique in which the resin composition is injection-molded and then compression-molded in the same one mold.

Preferably, the thus molded material is then after-treated to provide a sufficiently flat sliding surface. After adjusting the parallelism and flatness of the molded material with e.g. a surface grinder, its surface is polished off by the thickness of about 10-50 $\mu$m with a lapping machine which has extremely fine abrasive grains made mainly of alumina or silicon carbide.

Since the resin composition, which is softer than metals, is lapped by hard abrasive grains, we initially had a fear that the abrasive grains might sink into the resin. But this never happened and good flatness and surface roughness were obtained. The reason is not clearly known. This is presumably because the harder the abrasive grains, the lower the heat buildup of the material to be lapped and thus the less the decrease in the surface hardness and the yield stress. When lapping the surface, it is finished to a desired flatness. Since it is possible to grind and lap a plurality of molded resin articles at the same time using such grinding and lapping machines in much a shorter time than when grinding and lapping ceramic or metallic articles, such resin articles can be manufactured at low cost.

In the valve assembly claimed in claim 1 of this invention, at least one of the valve seat and the valve body is formed of a resin composition comprising a polycyanoarylether resin and carbon fiber having an average fiber diameter of 8 $\mu$m or less. It exhibits excellent lubricity and wear resistance and is highly resistant to mechanical and thermal shocks. Also, its sliding contact surface can be molded and finished to desired surface roughness and flatness with high accuracy, so that it can maintain high practical water cut-off ability and operability for a prolonged period of time.

This tendency is more remarkable with the valve assembly claimed in claim 2, in which part of the carbon fiber is replaced by a heat-resistant inorganic powdery filler.

The valve body claimed in claim 3 contains as the heat-resistant inorganic powdery filler a ceramic powder having a predetermined average particle diameter. Such a valve body is less likely to be damaged even if foreign matter should get in. It is thus possible to prevent water leakage more reliably.

BEST MODE FOR EMBODYING THE INVENTION

Figure 1:
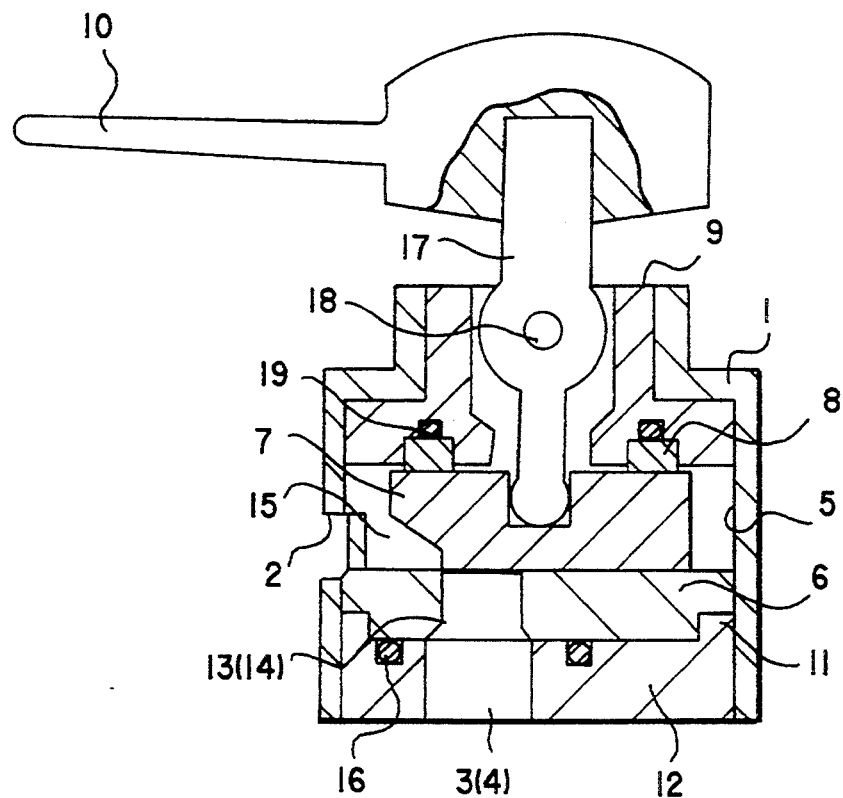
FIG. 1 is a vertical sectional view showing a faucet for household tap water.
Figure 2:
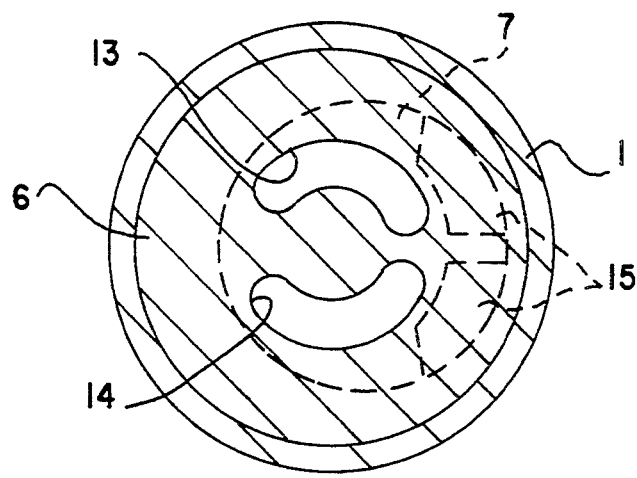
FIG. 2 is a cross-sectional view of the valve assembly of the same showing an operational state.
Figure 3:
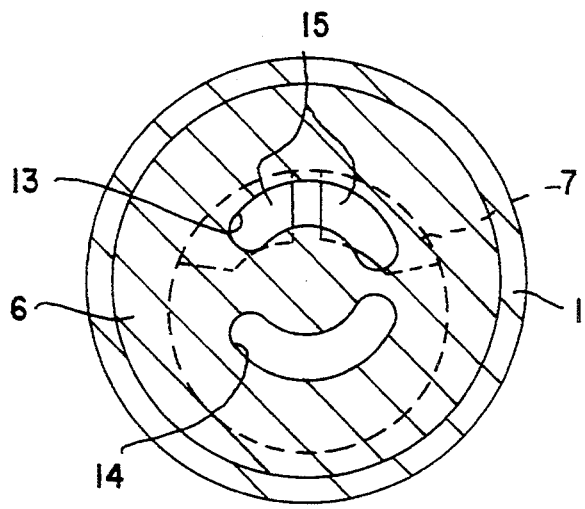
FIG. 3 is a cross-sectional view of the same showing a different state.
Figure 4:
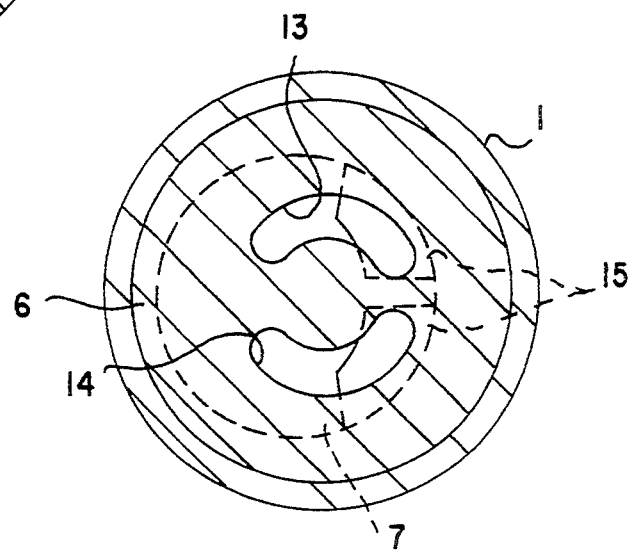
FIG. 4 is a cross-sectional view of the same showing still another state.

The materials used in Examples and Comparative Examples are shown below. Abbreviations are shown in brackets. The contents are in weight percent.

(1) Polycyanoarylether resin (PEN) made by Idemitsu Kosan: ID300
(2) Tetrafluoroethylene resin (PTFE) made by Mitsui Dupont Fluorochemical: Teflon-7J
(3) Ultra-high-molecular-weight polyethylene (HMWPE) made by Mitsui Oil Chemical: LUBMER injection-molded grade
(4) Polyetherimide resin (PEI) made by General Electric of U.S.A.: Ultem 1000
(5) Polyether sulfone resin (PES) made by I.C.I. of England: VICTREX 4800P
(6) Carbon fiber-1 (HTA) made by Toho Rayon: BESFIGHT HTA, fiber diameter: 7.2 $\mu$m, tensile elastic modulus: 24000 kgf/mm$^2$, tensile elongation 1.52%
(7) Carbon fiber-2 (HM-35) made by Toho Rayon: BESFIGHT HM-35, fiber diameter: 6.7 $\mu$m, tensile elastic modulus: 35000 kgf/mm$^2$, tensile elongation 0.77%
(8) Carbon fiber-3 (KCF) made by Kureha Chemical: KRECA CHOP C-106S, fiber diameter: 14.5 $\mu$m, tensile elastic modulus: 3200 kgf/mm$^2$, tensile elongation 2.2%
(9) Carbon fiber-4 (HM-50) made by Kashima Oil: Carbonic HM50, fiber diameter: 10 $\mu$m, tensile elastic modulus: 50000 kgf/mm$^2$ tensile elongation 0.56%
(10) Glass fiber (GF) made by Asahi Fiber Glass: GLASRON CS. chopped strand, fiber diameter: 13 $\mu$m, treated with aminosilane coupling agent
(11) Potassium titanic acid whiskers (PTW) made by Otsuka Chemical: TISMO D101, fiber diameter: 0.3 $\mu$m, treated with aminosilane coupling agent
(12) Caolin (Caolin) made by Shiraishi Calcium: ST filler ST-100, average particle diameter; 2 $\mu$m, about 98% particles are 50 $\mu$m or less in diameter
(13) Mica-1 (Mica-1) made by Canada Mica: mica S-325, average particle diameter: 13 $\mu$m, about 99% particles are 50 $\mu$m or less in diameter
(14) Mica-2 (Mica-2) made by Canada Mica: mica S-200, average particle diameter: 60 $\mu$m, about 40% particles are 50 $\mu$m or less in diameter
(15) Calcium carbonate made by Nitchitsu Kogyo: NA-600, average particle diameter: 3.5 $\mu$m, about 98% particles are 50 $\mu$m or less in diameter
(16) Talc (Talc) made by Matsumura Sangyo: Hi-Filler #12, average particle diameter: 4 $\mu$m, about 98% particles are 50 $\mu$m or less in diameter
(17) Silicon nitride powder made by Denki Kagaku Kogyo: SN-5S, average particle diameter: 5 $\mu$m
(18) Boron nitride powder made by Denki Kagaku Kogyo: GP, particle diameters: 1-5 $\mu$m
(19) Polyphenylene sulfide resin (PPS) made by Tohpren: T-4
(20) Polyetheretherketone resin (PEEK) made by I.C.I. of England: VICTREX 450P Examples 1-12:

Carbon fiber was bundled using an epoxy sizing agent and cut to the length of 6 mm. The materials were dry-mixed at the rates shown in Tables 1 and 2. The mixtures were then fed into a twin-screw extruder (made by Ikegai Tekko: PCM-30) to granulate them by extruding, while keeping the cylinder temperature at 360° C. and the screw at 50 rpm. The pellets thus obtained were injection-molded at the cylinder temperature of 370° C., the injection-molding pressure of 700–1800 kgf/cm² and the mold temperature of 190° C to obtain valve bodies of the same type as a single-lever mixing faucet KM300N made by KVK as shown in FIGS. 1–4.

After molding, these resin valve bodies had their sliding contact surfaces machined with a surface grinder to increase their flatness and then with a lapping machine to reduce their surface roughness.

We conducted the following practical function tests using valve devices each comprising one of the valve bodies thus made, and a valve seat made of alumina, to measure their water cut-off capabilities, surface configurations, and amounts of change in wear coefficient. The results are shown in Table 1.

(1) Water cut-off capability and handle torque.

We conducted an initial torque test and water cut-off test before carrying out an endurance test, using a single-lever type water-mixing faucet KM300N made by KVK, in which the disc of the valve body 7 shown in FIG. 1 is replaced by a resin disc according to each example of this invention, and the valve seat 6 adapted to be brought into sliding contact with the valve body is made of alumina. In the torque test, the torques when moving the lever up and down (cutting off water, supplying water, and adjusting flow rate) and right and left (water temperature adjustment) were measured using a digital force gauge DFG-2K made by Shimpo Kogyo.

In the water cut-off test, the lever was moved to the central lowermost position (where water supply is cut off). In this state, the water pressure was increased up to 10.0 kgf/cm² to measure the maximum water pressure at which not even the slightest water leakage was observed for one full minute.

Figure 5:
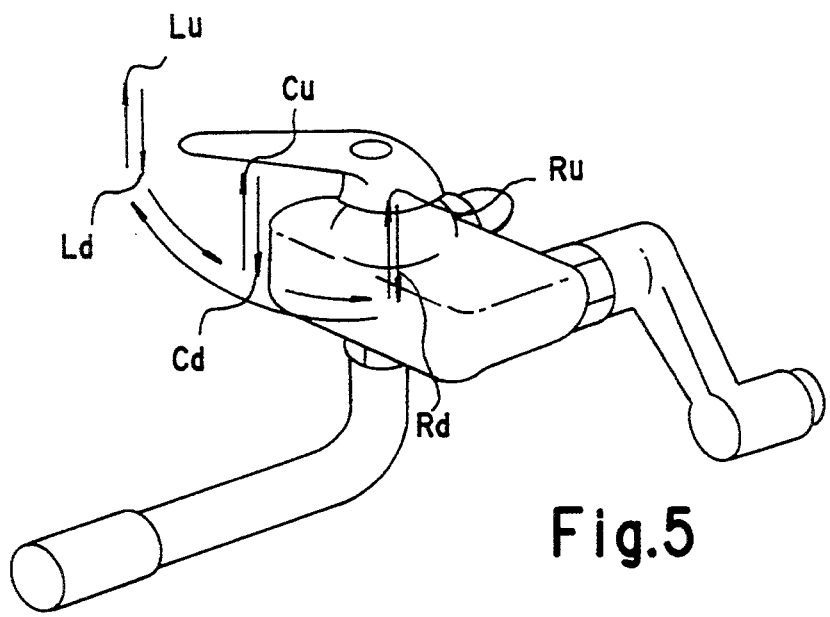
FIG. 5 is a perspective view showing the external appearance of the faucet of FIG. 1.

Among these single-lever water-mixing type faucets, only those devices that showed a torque equal to or lower than 5 kgf/cm and that were capable of completely cutting off water at the water pressure of 10.0 kgf/cm² were subjected to the endurance test. In this test, the lever 10 of each faucet was coupled to a single-lever type water-mixing faucet endurance tester (not shown) and was moved as shown in FIG. 5 from the upper right position Ru to the lower right position Rd (cold water)→lower left Ld (hot water: 90° C.)→upper left Lu (water off)→lower left Ld (hot water: 90° C.)→lower center Cd (warm water)→upper center Cu (water off)→lower center Cd (warm water)→lower right Rd (cold water)→upper right Ru (water off). This cycle (which took about 25 seconds) was repeated 200000 times. At 100000-cycle and 200000-cycle points, their torques and water cut-off capabilities were measured in the same way as in the initial tests. For the faucets that showed water cut-off capability lower than the initial result, no further endurance test was carried out.

(2) Surface roughness

We measured the surface roughness Ra (μm) of the sliding contact surface of each valve body (valve body 7 shown in FIG. 1) using a surface roughness gauge (made by Japan Vacuum: type Dektak II).

(3) Scratch test conducted by actually mounting the valve bodies in faucets

In this test, we used single-lever water-mixing type faucets KM300 made by KVK. For valve bodies 7 shown in FIG. 1, those of Examples 4–6 were used, while their valve seats 6 were made of alumina. One gram of metal pieces having an average grain diameter of 3 μm were fed into the faucet through the inlet passages 3 and 4 shown in FIG. 1, together with water which was supplied at the rate of 8 liters/minute. All this while, the abovementioned lever operation cycle was repeated 10 times. After the test, the sliding contact surface of each valve body 7 was measured using the abovementioned surface roughness gauge. In Table 1, the mark ☆ is affixed to the samples that was completely free of scratches on the sliding contact surface. ○ means that the sample suffered scratches but their depths were shallower than 1 μm. A means that the sample developed scratches deeper than 1 μm.

EXAMPLE 13

In this Example, both the valve seat 6 and the valve body 7 shown in FIG. 1 were formed from a resin, with the contents of the materials and the granulation, molding and machining conditions being the same as in Example 11. They were mounted in a single-lever type water-mixing faucet KM300N made by KVK. Their properties were measured in the same manner as with Examples 1–10. The results are shown in Table 2 together with their contents of materials. (3) Water cut-off properties before and after absorbing water.

A valve seat made of alumina and the valve body of Example 2 were mounted in a single-lever type water-mixing faucet KM300N made by KVK, which is of the same structure as the valve assembly shown in FIG. 1. We measured its water cut-off properties immediately after starting the experiment (initial) and after immersing it in hot water kept at 90° C. for 200 hours. In this water cut-off test, we applied a water pressure up to 10.0 kgf/cm² with a pump for 30 seconds, with the lever held in the lower-center position (where water supply is cut off). While applying the pressure, we measured the amount of pressure drop due to water leakage.

(4) Change in surface condition before and after absorbing water

By use of a surface roughness meter (made by Japan Vacuum: Dektak II), we measured the surface shape of the sliding contact surface of each valve body before use and after immersing it in hot water kept at 90° C. for 200 hours. We evaluated the change in shape before and after use in three stages. The marks ☆, O and X mean that the surface shape changed less than 3 μm, between 3 μm and 5 μm, and more than 5 μm, respectively.

Comparative Examples 1–10

Valve bodies of Comparative Examples 1–6, which are structurally the same as the valve body 7 shown in FIG. 1, were formed in exactly the same way as with Example 1 except that the contents of the materials were different as shown in Table 3. The valve body 7 of Comparative Example 7 was formed by vaporizing the sizing agent for the carbon fiber by heat treatment, cutting the carbon fiber to the length of 1 mm, dry-mixing the materials at the ratios shown in Table 3 in a Henschel mixer, taking the mixture while applying a pressure of 500 kgf/cm² with a press, calcining it at the temperature of 370° C., and cooling and machining it.

In Comparative Examples 8–10, the materials were dry-mixed at the ratios shown in Table 3. The mixture was fed into a twin-screw extruder (made by Ikegai Tekko: PCM-30) and extruded for granulation at the cylinder temperature of 260° C. and the screw revolving speed of 50 rpm for Comparative Example 8 and at the cylinder temperature of 350° C. and the screw revolving speed of 50 rpm for Comparative Examples 9 and 10. Then, the valve body 7 of Comparative Example 8 was formed by injection-molding the pellets obtained at the cylinder temperature of 270° C., the injection pressure of 600 kgf/cm², and the mold temperature of 50° C., while the valve bodies 7 of Comparative Examples 9 and 10 were formed by injection-molding the pellets at the cylinder temperature of 370° C., the injection pressure of 800 kgf/cm², and the mold temperature of 170° C.

Then, their sliding contact surfaces were ground and lapped in the same way as in Example 1. We measured the surface roughness of the thus obtained valve bodies and tested them for their practical function. The results are shown in Table 3.

Comparative Examples 11

Both the valve seat 6 and the valve body 7 shown in FIG. 1 were formed by adding the materials at the same ratios and under the same granulation, molding and machining conditions as in Comparative Example 2.

Their properties were examined in the same manner as in Examples 1–12. The results are shown in Table 3.

Comparative Examples 12, 13

We prepared valve devices each having a valve body which is exactly the same as the valve body of Example 2 except that the contents of the materials are different as shown in Table 4, and a valve seat made of alumina. Their properties were examined in the aforementioned experiments (3) and (4). The results are shown in Table 4.

As will be apparent from Tables 1–4, Examples 1–13 were small in surface roughness. Also, no water leakage was observed when a maximum of 10.0 kgf/cm² water pressure was applied after the 200000-cycle endurance test in the practical functional tests, as well as before such a test. The handle torque was also sufficiently small. The torque was especially small in Examples 4–11 and 13, which contained powdery fillers, and in Example 7, in which was used a carbon fiber having a high elastic modulus of 35000 kgf/mm² or higher.

Examples 5 and 6, which contained ceramic powder as a powdery filler, suffered no scratches at all or only scratches that are not deeper than 1 μm, during the damage test in which they were actually mounted in a faucet. In this regard, Examples 5 and 6 are superior to Example 4, which contains mica as a powdery filler.

On the other hand, Comparative Example 1, which contained carbon fiber at a content lower than the predetermined range though their carbon diameter was under 8 μm, Comparative Example 5, which contained a fiber other than carbon fiber, Comparative Example 6, which contained a powdery filler having an average particle diameter larger than 20 μm, were all incapable of cutting off water when its pressure was 10.0 kgf/cm² even before the endurance test. They were also higher in handle torque than Examples. Comparative Examples 7 and 8, which were formed of a resin other than PEN, were extremely low in water cut-off capabilities though the handle torque was relatively small. Comparative Examples 9 and 10, which were formed of a polyetherimide resin and a polyetherlsulfone resin, respectively, caused an abnormal increase in the handle torque though their water cut-off ability was relatively high. In fact, the handle torque was too large to be acceptable for practical purposes.

Comparative Examples 2 and 3, which contained carbon fiber having too large fiber diameters, also resulted in increased handle torque. Also, the water cut-off abilities of Comparative Examples 2 and 3 dropped when the lever-operation cycle was repeated 100000 times and 200000 times, respectively. Comparative Example 4, which contains glass fiber, showed increased handle torque and was low in water cut-off ability.

Comparative Example 11, in which both the valve body and the valve seat were formed of a synthetic resin but its composition was out of the predetermined range, was extremely low in water cut-off ability as measured in the endurance test, when compared with Example 11.

In summary, Comparative Examples 1–11 were inferior in both the water cut-off ability and the ability to keep the handle torque at a low level. Besides, Comparative Examples 4, 7 and 8 were inferior in surface roughness, too.

(Effect)

According to this invention, as explained above, at least one of the valve seat and the valve body of the valve assembly is formed of a resin composition comprising a polycyanoarylether and a predetermined amount of a predetermined carbon fiber. It can maintain sufficiently high water cut-off ability even after prolonged use within a wide water temperature range from cold water to hot water. Lever operability remains smooth for a prolonged period of time. Part of the carbon fiber may be replaced by a predetermined heat-resistant inorganic powdery filler. Also, the valve body may be made of a composition that contains ceramic powder having a predetermined average particle diameter. Such valve bodies are less likely to be damaged after long use.

TABLE 1

| Item | Example Nos. | | | | | |
|---|---|---|---|---|---|---|
| | 1 | 2 | 3 | 4 | 5 | 6 |
| Material content (wt %) | | | | | | |
| Synthetic resin PEN (1) | 90 | 70 | 40 | 40 | 40 | 40 |
| Fibrous filler | | | | | | |
| HTA (6) | 10 | 30 | 60 | 15 | 15 | 15 |
| HM-35 (7) | — | — | — | — | — | — |
| Powdery filler | | | | | | |
| Caolin (12) | — | — | — | — | — | — |
| Mica-1 (13) | — | — | — | 45 | — | — |
| Silicon nitride (17) | — | — | — | — | 45 | — |
| Boron nitride (18) | — | — | — | — | — | 45 |
| Practical function test | | | | | | |
| Water cut-off capability (kgf/cm²) | | | | | | |
| Before endurance test | 10.0 | 10.0 | 10.0 | 10.0 | 10.0 | 10.0 |
| After 100000 cycles | 10.0 | 10.0 | 10.0 | 10.0 | 10.0 | 10.0 |
| After 200000 cycles | 10.0 | 10.0 | 10.0 | 10.0 | 10.0 | 10.0 |
| Handle torque (kgf.cm) | | | | | | |
| Before endurance test | 3.5 | 3.6 | 3.8 | 2.4 | 2.3 | 2.1 |
| After 100000 cycles | 4.0 | 3.9 | 4.1 | 2.7 | 2.8 | 2.5 |
| After 200000 cycles | 4.3 | 4.7 | 4.5 | 3.1 | 3.2 | 2.9 |
| Surface roughness Ra (μm) | 0.2 | 0.3 | 0.5 | 0.1 | 0.1 | 0.1 |
| Scratch test | — | — | — | Δ | ○ | ○ |

TABLE 2

| Item | 7 | 8 | 9 | 10 | 11 | 12 | 13* |
|---|---|---|---|---|---|---|---|
| Material content (wt %) | | | | | | | |
| *Synthetic resin* | | | | | | | |
| PEN (1) | 70 | 60 | 60 | 60 | 60 | 60 | 60 |
| *Fibrous filler* | | | | | | | |
| HTA (6) | — | 20 | 20 | 20 | 20 | 40 | 20 |
| HM-35 (7) | 30 | — | — | — | — | — | — |
| *Powdery filler* | | | | | | | |
| Caolin (12) | — | 20 | — | — | — | — | — |
| Mica-1 (13) | — | — | 20 | — | — | — | — |
| Calcium Carbonate (15) | — | — | — | 20 | — | — | — |
| Talc (16) | — | — | — | — | 20 | — | 20 |
| Practical function test | | | | | | | |
| *Water cut-off capability (kgf/cm²)* | | | | | | | |
| Before endurance | 10.0 | 10.0 | 10.0 | 10.0 | 10.0 | 10.0 | 10.0 |
| After 100000 cycles | 10.0 | 10.0 | 10.0 | 10.0 | 10.0 | 10.0 | 10.0 |
| After 200000 cycles | 10.0 | 10.0 | 10.0 | 10.0 | 10.0 | 10.0 | 10.0 |
| *Handle torque (kgf·cm)* | | | | | | | |
| Before endurance test | 2.1 | 2.8 | 2.3 | 2.8 | 2.2 | 3.6 | 2.0 |
| After 100000 cycles | 2.4 | 3.0 | 2.7 | 3.1 | 2.6 | 4.0 | 2.1 |
| After 200000 cycles | 2.7 | 3.3 | 3.0 | 3.5 | 3.0 | 4.4 | 2.2 |
| Surface roughness Ra (μm) | 0.1 | 0.1 | 0.1 | 0.1 | 0.1 | 0.3 | — |

*; For both the valve seat 6 and the valve body 7, the same contents of materials were used.

TABLE 3

| Item | 1 | 2 | 3 | 4 | 5 | 6 | 7 | 8 | 9 | 10 | 11* |
|---|---|---|---|---|---|---|---|---|---|---|---|
| Material content (wt %) | | | | | | | | | | | |
| *Synthetic resin* | | | | | | | | | | | |
| PEN (1) | 95 | 70 | 70 | 70 | 70 | 60 | — | — | — | — | 70 |
| PTFE (2) | — | — | — | — | — | — | 70 | — | — | — | — |
| HNWPE (3) | — | — | — | — | — | — | — | 70 | — | — | — |
| PET (4) | — | — | — | — | — | — | — | — | 70 | — | — |
| PES (5) | — | — | — | — | — | — | — | — | — | 70 | — |
| *Filler* | | | | | | | | | | | |
| HTA (6) | 5 | — | — | — | — | 20 | 30 | 30 | — | 30 | — |
| KCF (8) | — | 30 | — | — | — | — | — | — | — | — | 30 |
| HM50 (9) | — | — | 30 | — | — | — | — | — | — | — | — |
| GF (10) | — | — | — | 30 | — | — | — | — | — | — | — |
| PTW (11) | — | — | — | — | 30 | — | — | — | — | — | — |
| Mica-2 (14) | — | — | — | — | — | 20 | — | — | — | — | — |
| Practical function test | | | | | | | | | | | |
| *Water cut-off capability (kgf/cm²)* | | | | | | | | | | | |
| Before endurance test | 6.5 | 10.0 | 10.0 | 10.0 | 5.5 | 7.5 | 3.0 | 3.0 | 10.0 | 10.0 | 10.0 |
| After 100000 cycles | — | 6.0 | 10.0 | 8.0 | — | — | — | — | 10.0 | 10.0 | 4.0 |
| After 200000 cycles | — | — | 5.5 | — | — | — | — | — | 10.0 | 10.0 | — |
| *Handle torque (kgf·cm)* | | | | | | | | | | | |
| Before endurance test | 4.0 | 5.7 | 4.9 | 9.4 | 5.0 | 4.0 | 2.7 | 2.4 | 10.5 | 10.0 | 3.7 |
| After 100000 cycles | — | 8.9 | 8.0 | 10.0 | — | — | — | — | 11.5 | 11.0 | 4.9 |
| After 200000 cycles | — | — | 9.3 | — | — | — | — | — | 12.0 | 12.0 | — |
| Surface roughness Ra (μm) | 0.3 | 0.6 | 0.7 | 1.5 | 0.5 | 0.6 | 1.8 | 1.0 | 0.3 | 0.3 | — |

*; For both the valve seat 6 and the valve body 7, the contents of material were used.

TABLE 4

| | Example | Comparative example | |
|---|---|---|---|
| Item | 2 | 12 | 13 |
| Material content (wt %) | | | |
| *Synthetic resin* | | | |
| PEN (1) | 70 | — | — |
| PPS (19) | — | 70 | — |
| PEEK (20) | — | — | 70 |
| Filler | 30 | 30 | 30 |
| HTA (6) | | | |
| Practical function test | | | |
| *Water cut-off capability (kgf/cm²)* | | | |
| Initial value | 0.2 | 0.2 | 0.2 |
| After absorbed | 0.4 | 4.1 | 2.5 |
| Change in surface shape | | X | O |

We claim:

1. A valve assembly comprising a valve seat formed with inlet passages, a valve body kept in sliding contact with said valve seat and formed with flow passages, said inlet passages and said flow passages being brought into and out of communication with each other by sliding said valve body with respect to said valve seat, characterized in that at least one of said valve seat and said valve body is formed of a resin composition comprising 35–90% by weight of a polycyanoarylether resin, and 10–65% by weight of carbon fiber having an average fiber diameter of not more than 8 μm.

2. A valve assembly as claimed in claim 1 wherein part of said carbon fiber is replaced by a heat-resistant inorganic powdery filler having an average particle diameter of not more than 20 μm.

3. A valve assembly as claimed in claim 2 wherein said heat-resistant inorganic powdery filler is partially or entirely a ceramic powder having an average particle diameter of not more than 10 μm.

* * * * *